United States Patent [19]

Nozaki et al.

[11] Patent Number: 4,622,942
[45] Date of Patent: Nov. 18, 1986

[54] FUEL INJECTION APPARATUS FOR INTERNAL COMBUSTION ENGINES

[75] Inventors: Shinya Nozaki; Keiichi Yamada; Takeo Kushida, all of Higashimatsuyama, Japan

[73] Assignee: Diesel Kiki Co., Ltd., Japan

[21] Appl. No.: 814,500

[22] Filed: Dec. 30, 1985

[30] Foreign Application Priority Data

Jan. 4, 1985 [JP] Japan .................................. 60-7

[51] Int. Cl.⁴ ............................................ F02M 39/00
[52] U.S. Cl. ..................................... 123/446; 123/447; 123/494; 123/498
[58] Field of Search ............... 123/446, 447, 506, 498, 123/494

[56] References Cited

U.S. PATENT DOCUMENTS

| | | | |
|---|---|---|---|
| 3,927,652 | 12/1975 | O'Neill | 123/498 |
| 3,983,855 | 10/1976 | Jarrett | 123/498 |
| 4,409,939 | 10/1983 | Eheim | 123/447 |
| 4,479,475 | 10/1984 | Babitzka | 123/446 |
| 4,526,150 | 7/1985 | Guntert | 123/447 |
| 4,554,903 | 11/1985 | Straubel | 123/446 |

Primary Examiner—Carl Stuart Miller
Attorney, Agent, or Firm—James C. Wray

[57] ABSTRACT

A fuel injection apparatus comprises a first storing device for temporarily storing cut-off fuel drained after the termination of a fuel injection, a second storing device of changeable volume for temporarily storing fuel for intake, the second storing device having a movable member which is movable in response to the quantity of fuel introduced therein, a detector for producing a detection signal showing an actural position of the movable member and a clamping device responsive to an electric signal for clamping the movable member. The clamping device is actuated to clamp the movable member in response to the detection signal when the desired amount of fuel is stored therein. The adjusted quantity of fuel stored in the second storing device is supplied to a high pressure chamber together with the cut-off fuel stored in the first storing device during the next fuel intake stroke of a fuel injection pump. As a result, extremely high accuracy control of fuel quantity can be realized.

12 Claims, 9 Drawing Figures

FUEL INJECTION APPARATUS FOR INTERNAL COMBUSTION ENGINES

BACKGROUND OF THE INVENTION

The present invention relates to a fuel injection apparatus for internal combustion engines, and more particularly to a fuel injection apparatus which is able to adjust the amount of fuel injected with high accuracy without increasing manufacturing cost and which is especially preferable for use as a unit injector.

An apparatus for improving the accuracy of the adjustment of the amount of fuel injected by a fuel injection apparatus for internal combustion engines is disclosed in Japanese Patent Application Public Disclosure No. 38631/82, in which the quantity of fuel intake is controlled by controlling the opening period of a solenoid valve provided on the fuel intake side of a fuel injection pump and the cut-off fuel is again taken in from a cut-off part of the fuel injection pump. In order to improve the accuracy of the adjustment of the fuel quantity, this proposed apparatus is constructed taking account of the fact that the amount of intake fuel adjusted by the solenoid valve is injected as it is when the cut-off fuel is again taken in at the fuel-intake storke.

However, in the proposed apparatus, since the adjustment of fuel quantity is carried out by the solenoid valve, which operates in synchronization with the intake stroke of the fuel injection pump, the accuracy of the adjustment of fuel quantity depends upon the operating performance of the solenoid valve, e.g. on the response characteristics and the like of the solenoid valve. Thus, to increase the accuracy of the adjustment of the fuel quantity, it is necessary to use a relatively expensive solenoid valve with high response characteristics, so that the manufacturing cost is liable to increase and miniaturization of the apparatus becomes difficult.

SUMMARY OF THE INVENTION

It is therefore an object of the present invention to provide an improved fuel injection apparatus for internal combustion engines.

It is another object of the present invention to provide a fuel injection apparatus which is able to adjust the fuel quantity with high accuracy without the use of a solenoid valve.

According to the present invention, in a fuel injection apparatus including a fuel injection pump which is adapted to carry out fuel intake, fuel pressurization, fuel injection and draining of cut-off fuel in accordance with the reciprocal movement of a plunger driven in synchronization with the rotational operation of an internal combustion engine, the apparatus comprises a first storing means for temporarily storing cut-off fuel drained at the time of the termination of a fuel injection, a second storing means of changeable volume for temporarily storing fuel for intake, the second storing means having a movable member which is movable in response to the quantity of fuel introduced therein, a detecting means for producing a detection signal relating to the amount of fuel stored in the second storing means, a clamping means responsive to an electric signal for clamping the movable member, a signal producing means for producing at least one condition signal relating to the operating condition of the engine, means responsive to at least one condition signal for producing a target signal relating to the optimum amount of fuel injection at each instant, a first means for introducing fuel supplied into the fuel injection pump into the second storing means when the plunger is at a predetermined first timing, a control signal generating means responsive to the detection and target signals for generating a control signal for driving the clamping means so as to store a desired amount of fuel in the second storing means, and a second means for introducing fuel stored in the first and second storing means into a high pressure chamber of the fuel injection pump at a predetermined second timing before the fuel pressurization operation by the plunger is carried out.

The position of the movable member required for obtaining the optimum amount of fuel injection at each instant is decided in the control signal generating means. When it is detected by the detecting means that the movable member has reached the required position, the control signal is produced by the control signal generating means and applied to the clamping means to cause it to clamp the movable member at that position, whereby the intake fuel quantity can be adjusted and the adjusted quantity of fuel is stored in the second storing means. That is, by the detecting means, it is detected whether or not the movable member is adjusted so as to obtain the optimum fuel quantity decided. Thus, the control of the fuel quantity is carried out. The adjusted quantity of fuel is supplied to the fuel injection pump together with the cut-off fuel stored in the first storing means during the next fuel intake stroke of the fuel injection pump. As a result, extremely high accuracy control of fuel quantity can be realized.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
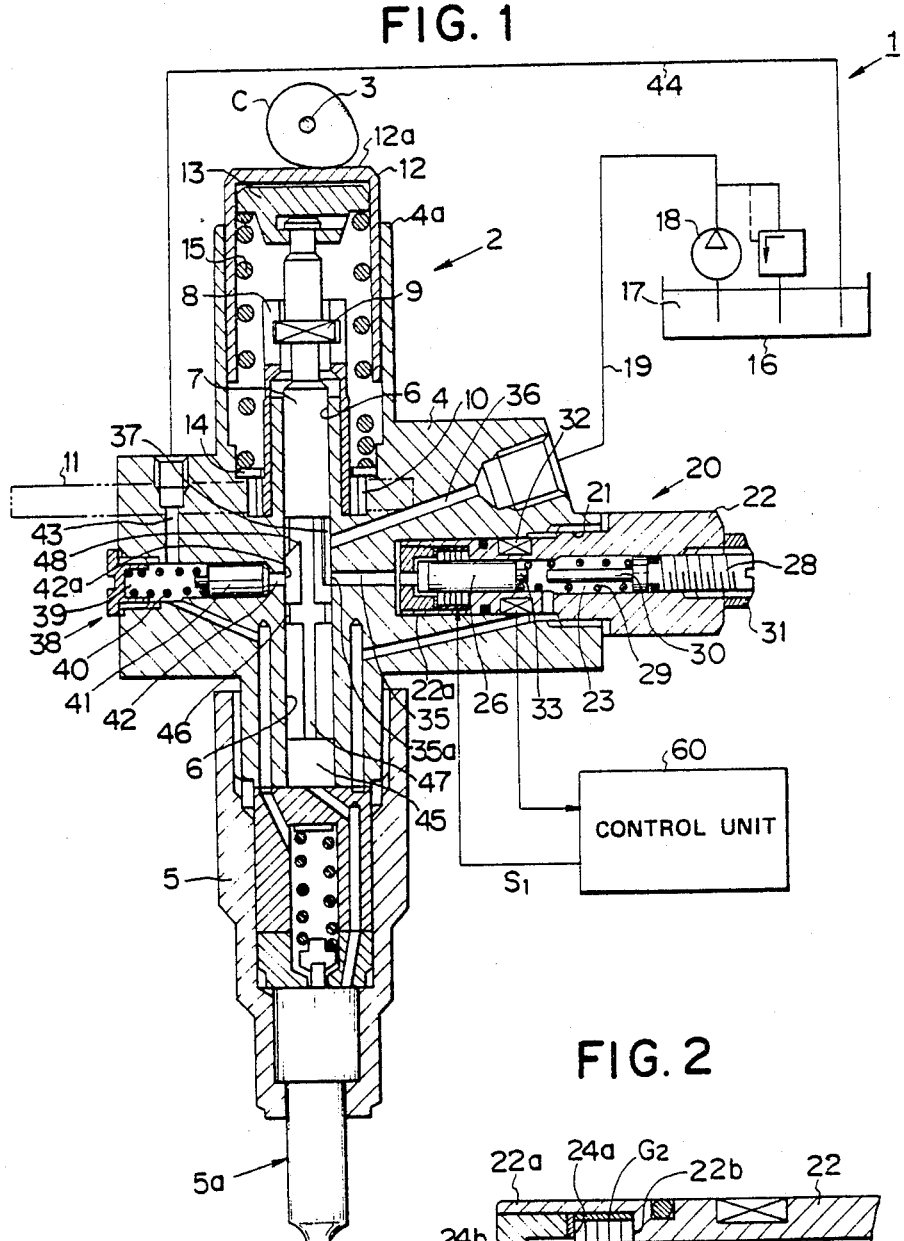
FIG. 1 is diagramatic illustration of an embodiment of the fuel injection system of the present invention including a cross-sectional view of a fuel injection pump.

FIG. 1 shows an embodiment of a fuel injection apparatus according to the present invention. A fuel injection apparatus 1 has a fuel injection pump 2 constructed as a unit injector and a control unit 60 for controlling the position of a quantity adjusting member provided in the fuel injection pump 2.

The fuel injection pump 2 has a casing 4 on the lower portion of which a fuel injection nozzle $5_a$ is mounted by means of a retaining nut 5. A guide hole 6 is defined in the casing 4 and a plunger 7 is provided in the guide hole 6 so as to be slidable in its axial direction. The upper end portion of the plunger 7 projects into a cylinder portion $4_a$ defined at the upper portion of the casing 4, and a control sleeve 8 located coaxially with the plunger 7 in the cylinder portion $4_a$ is connected with the plunger 7 by a flange portion 9 formed at the upper portion of the plunger 7. The plunger 7 and the control sleeve 8 are so connected as to allow the plunger 7 to move axially independently of the control sleeve 8, but to be rotated together with the control sleeve 8. A pinion 10 is forcibly fit at the lower end portion of the control sleeve 8 and the rotational position of the plunger 7 can be adjusted by the adjustment of the position of a rack 11 meshed with the pinion 10. There is provided a tappet 12 formed as a cap-like member relative to the cylinder portion $4_a$. An expansion spring 15 is provided between a spring shoe 13 in the tappet 12 and another spring shoe 14 provided on the bottom surface of the cylinder portion $4_a$, and the upper end of the plunger 7 is connected with the spring shoe 13. Thus, the plunger 7 is always biased in the upward by the spring 15.

The upper end surface $12_a$ of the tappet 12 is in contact with a cam C rigidly mounted on an engine crankshaft 3 under pressure, so that the plunger 7 reciprocates axially in accordance with the rotation of the cam C, that is, in synchronization with the rotation of the engine.

Fuel 17 in a fuel tank 16 is pressurized by an oil pump 18 and is supplied as intake fuel through a fuel pipe 19 to the fuel injection pump 2. For temporarily storing a desired quantity of the intake fuel, a fuel storage mechanism 20 is attached to the casing 4.

The arrangement of the fuel storage mechnism 20 will now be described in conjunction with FIGS. 1 and 2. The fuel storage mechanism 20 has a cylindrically shaped casing 22 which is firmly screwed into a tapped hole 21 defined in the casing 4. The casing 22 has an inner hole 23 which has an enlarged portion at the top portion $22_a$, and a stopper 24 is forcibly fit in this enlarged portion. A plurality of piezoelectric rings 25 are provided to extend between an inner end $24_a$ of the stopper 24 and a shoulder $22_b$ in the hole 23. A quantity adjusting piston 26 is accomodated in the hole 23 so as to provide an oil-tight condition between the outer surface of the quantity adjusting piston 26 and the inner surface of the smaller diameter portion of the hole 23, thereby enabling fuel to be stored in a chamber 27 formed between the quantity adjusting piston 26 and the stopper 24.

Figure 2:
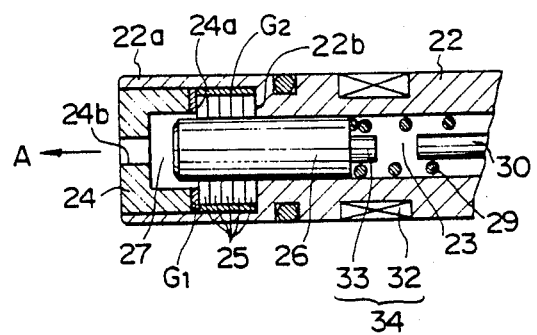
FIG. 2 is an enlarged sectional view of the important portion of the fuel storage mechanism of the FIG. 1.

In FIG. 2, reference symbols $G_1$ and $G_2$ designate gaskets for maintaining the oil tight condition of the chamber 27.

An adjusting screw 28 is screwed into the other end of the hole 23 and the quantity adjusting piston 26 is biased in the direction shown by arrow A by a spring 29 provided between the adjusting screw 28 and the quantity adjusting piston 26. Consequently, as the pressurized fuel is introduced into the chamber 27 as described later, the quantity adjusting piston 26 is moved in the direction opposite to arrow A. Reference numeral 30 designates a stopper for setting the maximum retracted position of the quantity adjusting piston 26. The stopper 30 is secured to the adjusting screw 28. Reference numeral 31 designates a lock-nut for locking the adjusting screw 28.

A position sensor 34 is provided in the casing 22 for detecting the position of the quantity adjusting piston 26. The position sensor 34 consists of a position detecting coil 32 and a magnetic core 33, the latter of which is attached at the rear end portion of the quantity adjusting piston 26 so as to move within the position detecting coil 32 in accordance with the movement of the quantity adjusting piston 26.

Therefore, the inductance of the position detecting coil 32 varies in accordance with the position of the quantity adjusting piston 26. The position detecting coil 32 is connected with the control unit 60, and the position of the quantity adjusting piston 26 at each instant can be detected in the control unit 60 on the basis of the inductance value of the position detecting coil 32. The position detecting operation will be described hereinafter in conjunction with FIG. 3.

The inner diameter of the piezoelectric rings 25 is slightly larger than that of the hole 23 when no voltage is applied thereto, whereby the quantity adjusting piston 26 is free to move axially. On the other hand, the diameter of the piezoelectric rings 25 decreases when the voltage is applied there to, whereby the quantity adjusting piston 26 is clamped by the piezoelectric rings 25 and is prevented from moving. A signal for controlling this clamping operation of the piezoelectric rings 25 is produced as a control signal $S_1$ from the control unit 60 and applied to the piezoelectric rings 25.

A passage $24_b$ for passing fuel into/from the chamber 27 is defined in the stopper 24. The passage $24_b$ is connected with one end of a passage 35 defined in the casing 4, the other end of which communicates with the guide hole 6. A passage 36 for leading fuel supplied through the fuel pipe 19 into the guide hole 6 is provided adjacent to the passage 35. The passage 36 is defined in the casing 4 in such a way that its inner end communicates with the guide hole 6 and the other end is connected with the fuel pipe 19. The inner end of the passage 35 is located adjacent to the inner end of the passage 36 and fuel can be supplied through the passage 35 and 36 into the fuel storage mechanism 20 during the time that a groove 37 defined in the side wall of the plunger 7 communicates with the inner end of the passage 35 with the inner end of the passage 36 during the descent of the plunger 7. The fuel supply to the fuel storage mechanism 20 becomes impossible when the plunger 7 ascends and the inner end of the passage 36 is closed by the side wall of the plunger 7.

A storage cylinder 38 for storing cut-off fuel is provided on the opposite side of the guide hole 6 from the fuel storage mechanism 20. The storage cylinder 38 comprises a cylindrical chamber 39 defined in the casing 4 and a piston 41 which is received in the chamber 39 and biased by a coil spring 40 in the direction of the guide hole 6. The inner end of the chamber 39 communicates with the guide hole 6 through a passage 42 and an intermediate portion of the chamber 39 communicates with the fuel tank 16 through a passage 43 and a pipe 44. The opening $42_a$ of the passage 42 faces the opening at the inner end of the passage 35 through the plunger 7.

A description will now be given of the operation by which the cut-off fuel is stored in the storage cylinder 38 by the reciprocal movement of the plunger 7 and the stored fuel is returned to a high pressure chamber 45 formed by the plunger 7 and the guide hole 6.

When the plunger 7 reaches its top end position, an annular groove 46 defined below the groove 37 of the plunger 7 communicates with the passage 42. As a result, the fuel stored in the storage cylinder 38 (that is, cut-off fuel obtained one stroke earlier) is supplied to the high pressure chamber 45 through the annular groove 46 and a vertical groove 47 for communicating the annular groove 46 with the high pressure chamber 45. In addition, as will be understood from FIG. 1, since the inner end of the passage 35 communicates with the annular groove 46 at this time, fuel stored in the fuel storage mechanism 20 is also simutaneously supplied therethrough into the high pressure chamber 45.

When the plunger 7 starts to descend and the passages 35 and 42 are closed by the side wall of the plunger 7, fuel in the high pressure chamber 45 is pressurized and ejected from the fuel injection nozzle 5. When the plunger 7 descends further and the opening of the passage 42 comes opposite a lead 48 connected with the vertical groove 47, the fuel injecting operation is terminated and the cut-off fuel is stored through the passages 47 and 42 into the storage cylinder 38. In addition, as mentioned before, since the groove 37 communicates the passage 35 with the passage 36 at the time of the fuel injecting operation, fuel from the fuel tank 16 is stored in the fuel storage mechanism 20 at the same time.

The lead 48 is inclined as shown in FIG. 1 so that it is possible to control the timing when the opening of the passage 42 begins to come opposite the lead 48 by using the rack 11 and the pinion 10 to adjust the rotational position of the control sleeve 8. As a result, the timing of the end of fuel injection can be adjusted.

Figure 3:
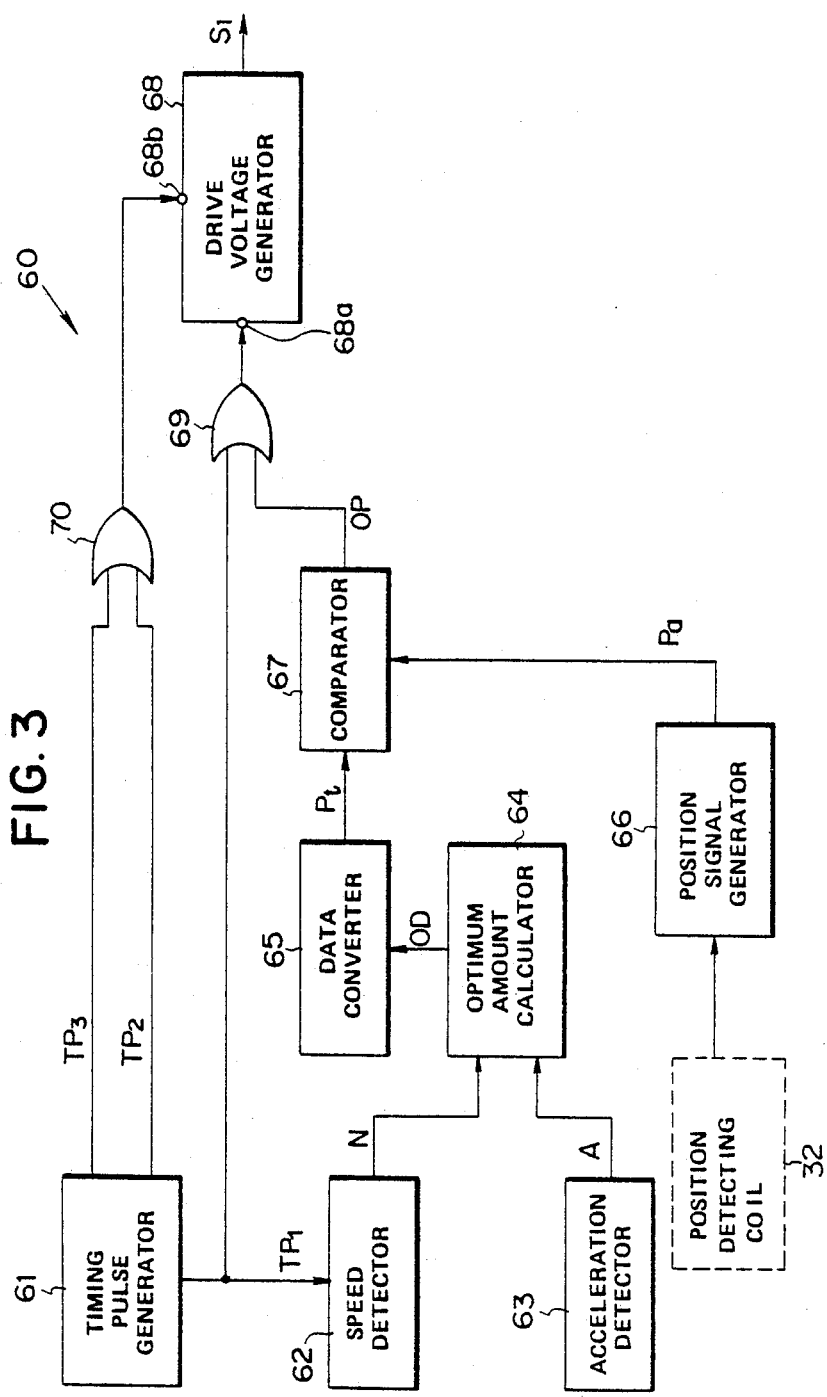
FIG. 3 is a block diagram of the control unit of FIG. 1.

FIG. 3 is a detailed block diagram of the control unit 60 shown in FIG. 1. The control unit 60 has a timing pulse generator 61 for generating timing pulses $TP_1$, $TP_2$ and $TP_3$, which indicate the timing of cam angles $\theta_1$, $\theta_5$ and $\theta_8$, respectively (see FIG. 4F). A speed detector 62 is responsive to the timing pulse $TP_1$ produced repetiively every rotation of the cam C and produces a speed signal N indicative of the speed of the internal combustion engine associated with the fuel injection pump 2, and an acceleration detector 63 produces an acceleration signal A indicative of the amount of operation of the accelerator pedal (not shown). The speed signal N and the acceleration signal A are applied to an optimum amount calculator 64 which calculates the optimum amount of fuel injection to the associated internal combustion engine on the basis of the these input signals N and A. Optimum data OD showing the result of the calculation by the optimum amount calculator 64 is applied to a data converter 65 in which the optimum data OD is converted to a target position data $P_t$ showing the desired position of the quantity adjusting piston 26.

A position signal generator 66 connected to the position detecting coil 32 produces actual position data $P_a$ showing the actual position of the quantity adjusting piston 26. The target and actual position data $P_t$ and $P_a$ are input to a comparator 67 and an output pulse signal OP is produced from the comparator 67 when the actual position data $P_a$ becomes equal to target position data $P_t$. The output pulse signal OP and the timing pulse $TP_1$ are applied through an OR gate 69 to one input terminal $68_a$ of a drive voltage generator 68 and the timing pulses $TP_2$ and $TP_3$ are applied through an OR gate 70 to the other input terminal $68_b$ of the drive voltage generator 68. The drive voltage generator 68 is arranged to produce the control signal $S_1$ whose level becomes high in response to the pulse input to its one input terminal $68_a$ and becomes low in response to the pulse input to the other input terminal $68_a$. Such a circuit is easily realized by the use of a flip-flop circuit.

Figure 4A:
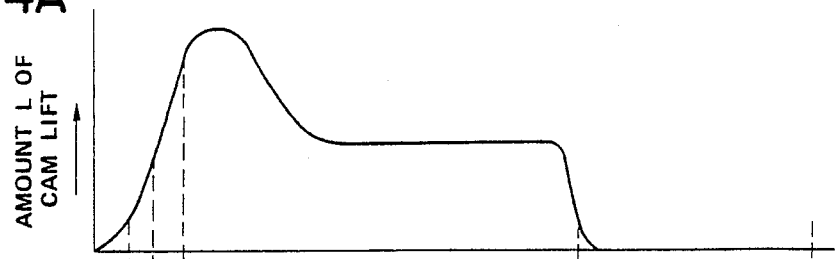
FIGS. 4A to 4F are graphs showing the operation of the system shown in FIG. 1.
Figure 4B:
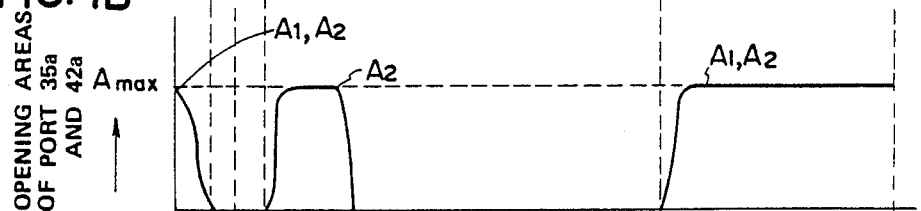
Figure 4C:
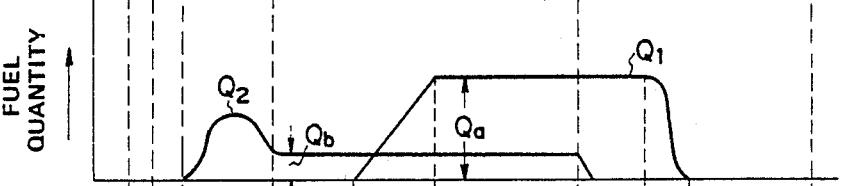
Figure 4D:
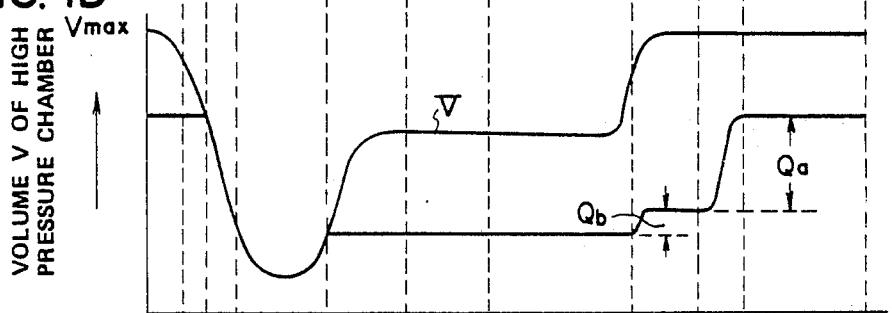
Figure 4E:
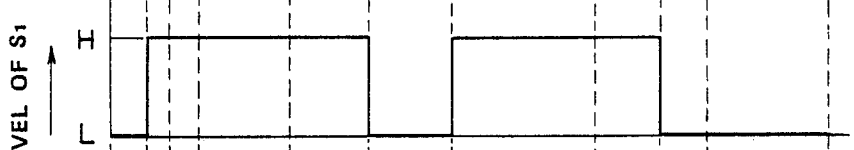
Figure 4F:
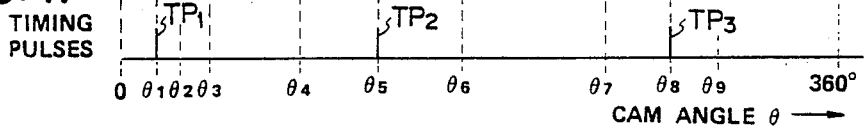

The operation of the fuel injection apparatus 1 shown in FIG. 1 will now be described with reference to graphs shown in FIGS. 4A to 4F. In FIGS. 4A to 4F, the abscissa represents the cam angle $\theta$. When the amount L of the cam lift is zero and the plunger 7 is at its top end position ($\theta=0$), the opening area $A_1$ of an intake port $35_a$, which is equal to the opening at the guide hole 6 end of the passage 35, and the opening area $A_2$ of the cut-off port $42_a$ of the passage 42 are equal to the maximum value $A_{max}$ (FIGS. 4A and 4B). At this time, the level of the signal $S_1$ is low so that the fuel adjusting piston 26 is not clamped by the piezoelectric rings 25 (FIG. 4E). The volume V of the high pressure chamber 45 is at its maximum value $V_{max}$ and fuel is supplied from the fuel storage mechanism 20 and the storage cylinder 38 into the high pressure chamber 45. In this case, the difference in volume between the maximum volume $V_{max}$ and the volume of fuel supplied remains in the high pressure chamber 45.

As the plunger 7 descends due to the rotation of the cam C, that is, the amount L of the lift of the cam C becomes large, the opening areas $A_1$ and $A_2$ decrease and become zero at $\theta=\theta_1$. After this, reduction of the volume of the high pressure chamber 45 begins. The volume of the air space formed in the high pressure chamber 45 becomes zero in the range of $\theta_1 \theta \theta_2$ due to the high pressure condition in the high pressure chamber 45. The fuel pressurization start at $\theta=\theta_2$. After the value of $\theta$ exceeds $\theta_2$, the plunger 7 decends with the rotation of the cam C and the volume V decreases during the fuel injecting operation.

When the cut-off port $42_a$ begins to come opposite the lead 43 at $\theta=\theta_3$, the opening area $A_2$ of the cut-off port $42_a$ becomes large rapidly. The fuel injection is terminated at the same time and the fuel quantity $Q_2$ stored in the storage cylinder 38 varies as shown in FIG. 4C. After this, the plunger 7 ascends and the cut-off port $42_a$ is closed by the side wall surface of the plunger 7 at $\theta=\theta_4$. In this case, the stored fuel quantity $Q_2$ remains a constant value $Q_b$ until the cut-off port $42_a$ is opened again at $\theta=\theta_7$. Thus, the difference in volume between the volumes of the high pressure chamber 45 and the fuel quantity $Q_b$ remains as an air space in the high pressure chamber 45.

When the intake port $35_a$ starts to open at $\theta=\theta_5$, the pressurized fuel starts to pass through the passage 36 and the groove 37 into the fuel storage mechanism 20. Since the timing pulse $TP_2$ is produced at this time, the level of the control signal $S_1$ becomes "L" to release the clamping of the quantity adjusting piston 26 by the piezoelectric rings 25. Consequently, the quantity adjusting piston 26 is retracted by the pressurized fuel and the fuel is stored in the resulting space 27. Thus, the fuel quantity $Q_1$ stored in the space 27 linearly increases after $\theta=\theta_5$. The fuel quantity $Q_1$ is detected in the form of the position of the quantity adjusting piston 26 by the use of the position sensor 34 and the result of the detection is obtained as the actual position data $P_a$ by the position signal generator 66.

The target position data $P_t$ obtained on the basis of the speed signal N and the acceleration signal A is compared with the actual position data $P_a$ in the comparator 67 and the output signal OP is produced when the actual position data $P_a$ becomes equal to the target position data $P_t$ (that is, at $\theta=\theta_6$). The level of the control signal $S_1$ becomes "H" due to the output signal OP whereby the quantity adjusting piston 26 is clamped by the piezoelectric rings 25.

Therefore, the fuel quantity $Q_1$ does not increase after $\theta_6$ and the fuel quantity decided in accordance with the position of the quantity adjusting piston 26 can be stored therein with high accuracy.

When the plunger 7 reaches a position adjacent to the top end position again at $\theta=\theta_7$, the ports $35_a$ and $42_a$ face the annular groove 46, so that the cut-off fuel is supplied from the storage cylinder 38 into the high pressure chamber 45. Since the timing pulse TP$_3$ is produced when $\theta$ becomes equal to $\theta_8$, the level of the control signal S$_1$ becomes "L" to release the clamped condition of the quantity adjusting piston 26 by the piezoelectric rings 25. As a result, the quantity adjusting piston 26 moves in the direction indicated by arrow A so that the ejection of the fuel stored in the fuel storage mechanism 20 is started and the fuel ejection is terminated at $\theta = \theta_9$.

As described hereinbefore, the fuel ejected from the fuel storage mechanism 20 and the storage cylinder 38 is supplied into the high pressure chamber 45 to be pressurized in the next pressurization stroke and the fuel is injected.

With this arrangement, the voltage for clamping the quantity adjusting piston 26 is supplied to the piezoelectric rings 25 when it is detected by the position sensor 34 that the quantity adjusting piston 26 is positioned at a desired position, whereby the adjustment of intake fuel quantity is carried out. Consequently, it is easily to fabricate a mechanism for adjusting the fuel quantity which is small in size and has good response characteristics. Thus, as compared with the case where a solenoid valve is used for adjusting the fuel quantity, the manufacturing cost can be remarkably lowered.

Furthermore, since the storage cylinder 38 is provided for temporarily storing the cut-off fuel remaining after the fuel injection and the cut-off fuel from the storage cylinder 38 is supplied to the high pressure chamber 45 in addition to the intake fuel adjusted by the use of the quantity adjusting piston 26 and the piezoelectric rings 25 when the fuel injection pump is in the intake stroke, the fuel quantity adjusted on the intake side is exactly coincident with the quantity of fuel injected. Thus, extremely high accuracy fuel quantity control for fuel injection can be realized with a small size apparatus without increase in cost.

We claim:

1. A fuel injection apparatus including a fuel injection pump which is adapted to carry out fuel intake, fuel pressurization, fuel injection and draining of cut-off fuel in accordance with the reciprocal movement of a plunger driven in synchronization with the rotational operation of an internal combustion engine, said apparatus comprising:

a first storing means for temporarily storing cut-off fuel drained at the same time of the termination of the fuel injection;

a second storing means of changeable volume for temporarily storing fuel for intake, said second storing means having a movable member which is movable in response to the quantity of fuel introduced therein;

a detecting means for producing a detection signal relating to the amount of fuel stored in said second storing means;

a clamping means responsive to an electric signal for clamping said movable member;

a signal producing means for producing at least one condition signal relating to the operating condition of said internal combustion engine;

means responsive to at least one condition signal for producing a target signal relating to the optimum amount of fuel injection at each instant;

a first means for introducing fuel supplied into said fuel injection pump into said second storing means when said plunger is at a predetermined first timing;

a control signal generating means responsive to said detection and target signals for generating a control signal for driving said clamping means so as to store a desired amount of fuel in said second storing means; and a second means for introducing fuel stored in said first and second storing means into a high pressure chamber of said fuel injection pump at a predetermined second timing before the fuel pressurization operation by said plunger is carried out.

2. An apparatus as claimed in claim 1 wherein said first storing means has a cylinder, a movable piston provided in said cylinder and a first spring for biasing said movable piston in one direction, whereby said movable piston is pressed against the force of said first spring by the pressure of the cut-off fuel to move said movable piston and the cut-off fuel is stored in the resulting space formed in said cylinder.

3. An apparatus as claimed in claim 1 wherein said second storing means has a storing casing which receives said movable member so as to allow said movable member to move axially and a second spring for biasing said movable member in one direction, whereby said movable member is moved against the force of said second spring in the other direction by the pressure of the fuel supplied and the fuel supplied is stored in the resulting space formed in said storing casing.

4. An apparatus as claimed in claim 3 wherein said detecting means detects the position of said movable member and the result of the detection is output as said detection signal.

5. An apparatus as claimed in claim 4 wherein said detecting means includes a detection coil and a core which is displaced within said detection coil in accordance with the position of said movable member.

6. An apparatus as claimed in claim 3 wherein said clamping means is at least one piezoelectric ring arranged coaxially with the said movable member and the inner diameter of said piezoelectric ring becomes small in response to the electric signal.

7. An apparatus as claimed in claim 3 wherein said second storing means is secured to a casing of said fuel injection pump.

8. An apparatus as claimed in claim 7 wherein said first means for introducing fuel has a first passage for communicating the inlet portion of said second storing means with a guide hole formed in the casing of said fuel injection pump for guiding said plunger, a second passage for passing the fuel supplied for said fuel injection pump, said second passage having an opening adjacent to the guide hole side opening of said first passage and a communicating groove defined on said plunger by which the openings of the guide hole side of said first and second passages are communicated at the predetermined first timing.

9. An apparatus as claimed in claim 1 wherein said control signal generating means generates a signal for activating said clamping means when a desired amount of fuel is stored in said second storing means.

10. An apparatus as claimed in claim 1 further comprising a third passage for communicating an input portion of said first storing means with a guide hole formed in a casing of said fuel injection pump for guiding said plunger.

11. An apparatus as claimed in claim 10 wherein said second means is a passage means defined on the peripheral surface of said plunger in such a way that the openings of the guide hole side of said first and second passages are communicated with said high pressure chamber at the predetermined second timing.

12. An apparatus as claimed in claim 1 wherein said control signal generating means produces a signal for stopping the activation of the clamping means at the predetermined second timing.

* * * * *